Sept. 5, 1961    M. C. GERRARD    2,999,189
PROTECTIVE ARRANGEMENTS FOR ELECTRICAL CIRCUITS AND APPARATUS
Filed Dec. 15, 1959
FIG.1.
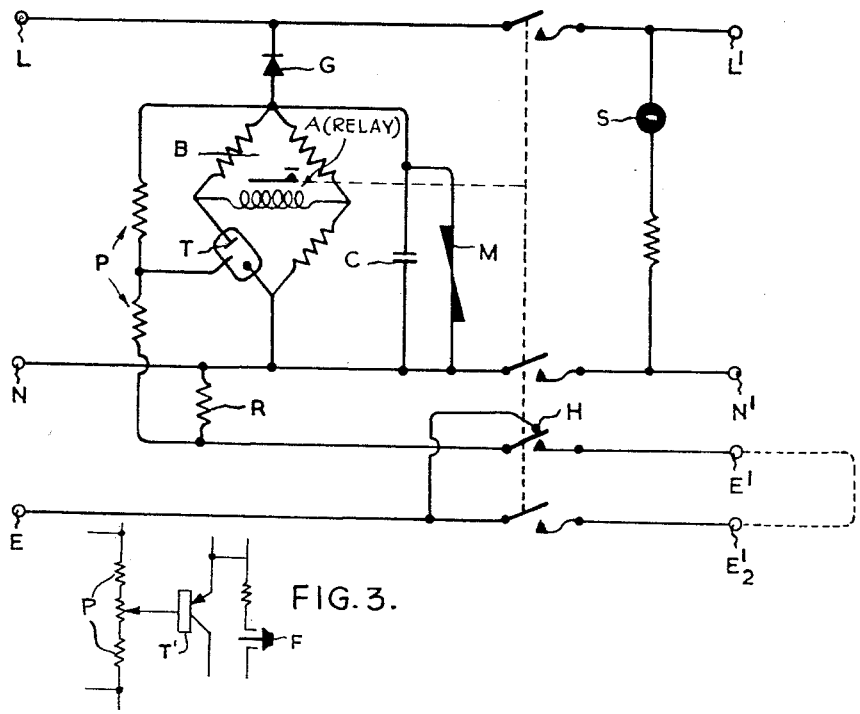
FIG.3.
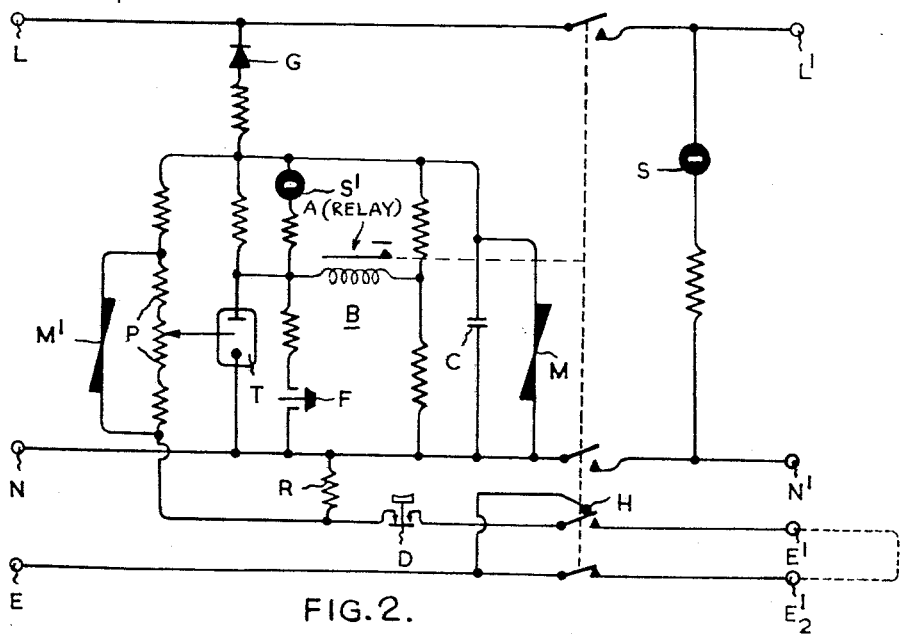
FIG.2.
Michael Cornelius Gerrard
Inventor
BY: Scrivener and Parker
Attys.

United States Patent Office 2,999,189
Patented Sept. 5, 1961

2,999,189
PROTECTIVE ARRANGEMENTS FOR ELECTRICAL CIRCUITS AND APPARATUS
Michael Cornelius Gerrard, 18 Highfield Road, Cheadle Hulme, England
Filed Dec. 15, 1959, Ser. No. 859,782
Claims priority, application Great Britain Dec. 16, 1958
5 Claims. (Cl. 317—18)

This invention is concerned with protective arrangements for electric circuits supplying current to apparatus, especially to portable or other domestic current-consuming appliances. In particular the aim is to protect the apparatus and the user from any danger arising through incorrect connections being made, or through a fault developing in the leads to the apparatus or in the apparatus itself.

A large proportion of portable domestic electrical appliances such as suction cleaners, hair dryers, lawn mowers, electric blankets, portable drills, are at the present day still only fitted with two-core cables, having live and neutral only, and there is no legal compulsion for the provision of an earth conductor. The consequent danger of the appliance becoming electrically live is increased if in addition the leads are connected wrongly to the supply so that the single-pole switch is in the neutral instead of in the live conductor.

Where three pin earthed supply sockets are provided there is still nothing to ensure that three-core cable is used to the appliance, and furthermore even where three-core cable is used there is no certainty that it will be connected correctly. When it is appreciated that there are six different possible ways of connecting three wires to three terminals, only one of which is correct, it will be understood that it is very easy for an appliance to be wrongly connected to a plug by inexperienced hands. Frequently the appliance works satisfactorily and the danger is not realised until an accident results.

Again, even with the appliance correctly wired to the plug, any interruption of the earth conductor will not be detected and the appliance will continue to be used in a potentially dangerous state. In industry the earth connection of portable appliances is often checked by discharging a heavy current through it from a test instrument from time to time, but no such check protects the domestic user of appliances.

It is known to provide various kinds of safety devices including differential transformers and relays, earth-leakage relays, and also transformers of which the secondary winding produces a low-voltage output which causes a current to circulate in the earth lead of the appliance to be protected. However, none of these devices so far proposed has ensured firstly that the earth connection is continuous right back to its point of union with the neutral line of the mains supply, and secondly that the appliance cannot be connected, even momentarily, unless the connections are substantially correct.

The aim of the invention is to overcome these drawbacks and to provide, as far as possible, an effective safeguard both against incorrect connection of the apparatus and against failure of the earth conductor, in addition to the usual fusible links in the supply protecting against overloads and short-circuits.

According to the invention, a safety device for disposal between a source of current supply and a current-consuming appliance comprises a detecting device such as a cold-cathode trigger tube or a transistor of which the main current path is connected in one arm of a bridge circuit of which one diagonal is disposed across leads designed to be connected across the supply, whilst the other diagonal carries the coil of a relay which has contacts controlling the connection of the supply to the appliance, and the sensitive member of the detecting device (i.e. the trigger electrode in the case of a cold cathode tube, or the base in the case of a transistor) is connected to a point in a potential divider between that lead which is designed to be connected to the live side of the supply and a lead for connection to an earth loop on the appliance.

Normally the device will be used to protect appliances running from an alternating current supply. In that case, the bridge may be supplied through a rectifier, and the current through the earth loop may or may not be fed through a rectifier, depending on whether or not it is thought desirable to have alternating current flowing in the earth loop.

The advantage of the bridge circuit is that it fails to safety. The relay contacts are normally open, isolating the appliance from the supply, and they only close if the relay is energised, which in its turn only occurs if the main voltage is available between the correct leads, with the live and neutral connected the right way round, and the earth lead of the mains is continuous right back to the star point of the supply transformer. Any rise in the potential of the trigger electrode above a predetermined value will fire the tube and its impedance will fall to a value such as to balance the bridge and cause the relay to drop out. Likewise, in the absence of mains voltage between the correct pair of leads the relay will not pick up in the first place.

An example of a safety device according to the invention will now be described with reference to the accompanying drawings, in which:

FIGURE 1 shows the circuit layout of one form of the device;

FIGURE 2 shows a more refined version of the layout of FIGURE 1, incorporating additional safety features and also including provisions for testing the working of the device;

FIGURE 3 is a partial view of the left hand side of the circuit of FIGURE 2 showing a transistor substituted for the cathode tube of FIGURE 2.

Referring first to FIGURE 1, which shows the circuit of a device suitable for use with an alternating current supply, terminals L, N and E are designed to be connected respectively to the live, neutral and earth connections of the supply. At the output of the device there are terminals N', L' and $E_1'$ and $E_2'$ for connection to a current-consuming appliance which is to be protected. The two terminals $E_1'$ and $E_2'$ are for connection to two separate points in the frame or earth shield of the appliance. For example, where the appliance includes an extended heating element, the element may be enclosed in a sheath throughout its length, and the two ends of this sheath are connected to the terminals $E_1'$ and $E_2'$ to complete an earth loop.

Between the live line (extending from L to L') and the neutral line (extending from N to N') of the device there is connected one diagonal of a bridge circuit B in series with a half-wave rectifier G. The other diagonal of the bridge circuit is spanned by the coil of a relay A, which controls contacts in all three leads between the input and output of the device as well as in an internal connection to the terminal $E_1'$ ($E_2'$ being connected to E). Three of the arms of the bridge are formed by resistors of fixed value and the fourth by the anode-cathode path of a cold-cathode trigger tube T, the cathode being at that side of the bridge which is connected to the neutral line. The trigger electrode of the tube T is connected to an intermediate point in a potential divider P of which the upper end is connected to the live end of the bridge and the lower end to the line, mentioned earlier, leading to the output earth terminal $E_1'$.

The potential across the bridge is established by a non-linear resistor M, and there is also a condenser C in parallel with the bridge to by-pass the alternating component of the current. In the output of the device, between the live and neutral lines, there is an indicator light S to show when the contacts of relay A are closed.

That contact of the relay A which is disposed between the lower end of the potential divider P and the terminal $E_1'$, includes a back contact connecting the divider P to the earth terminal E when the relay is not energised. There is also a high resistance R between the lower end of the potential divider P and the neutral line.

When the device is correctly connected to the supply and to the appliance, and all is in order, the potential difference appearing between the live and neutral lines of the appliance causes a current to flow through the coil of relay A, as the trigger tube T is non-conducting and so the bridge is unbalanced. The contacts close and current is fed to the appliance. If the earth loop of the appliance is continuous, the relay A remains energised, but if it is broken the lower end of the divider P will no longer be held down to earth potential, and so the potential of the trigger electrode of the tube T will rise until the tube fires and the values of the resistors forming the remaining arms of the bridge are such that the bridge now becomes balanced and the relay A drops out. Furthermore, if the earth line of the supply had been at a potential above that of the neutral line exceeding a predetermined very small amount, or had been broken, the relay would never have been energised in the first place as the tube T would have fired immediately on connection of the device to the supply, balancing the bridge and preventing energisation of the relay.

Thus, if any of the mains supply connections are faulty, the relay A will not close. Likewise it will not stay closed if the earth loop of the appliance is faulty. It will be noted that the contact in the lead $E_1'$ is such that it closes before the remainder, so if there is a fault in the earth loop of the appliance the contacts in the leads to L' and N' will never have a chance to close.

Subsequently, the relay will drop away if any fault develops anywhere in the earth connection right back to the star point of the mains supply transformer where the neutral is earthed. The relay will of course also drop away on interruption of the live or neutral line.

The resistor R prevents any high potential appearing on the earth wire in the event of breakage of that wire between the device and the supply.

The modified device of which a circuit diagram is shown in FIGURE 2 is similar to that of FIGURE 1 and the same reference letters have been used for corresponding parts, but certain refinements are included. The point on the potential divider P to which the trigger electrode of the tube T is connected is made adjustable, and the potential drop across this divider is stabilised by a further non-linear resistor M'. The lead between the lower end of the potential divider P and the terminal $E_1'$ includes a test button D enabling the earth loop to be deliberately broken at will to see that the device operates correctly. A re-set button F in a path parallel with the anode-cathode path of the tube T enables one to short-circuit the tube and de-ionize it to unbalance the bridge and close the relay A again after testing. The circuit also includes a red signal light S' to show when a fault occurs and an amber light S to show when current is available at the output for the appliance.

Further possible modifications include the stabilisation of the divider P by means of neon tubes in place of the resistor M', and the connection of the upper end of the divider to the live line instead of to the junction of the bridge and the rectifier. To detect leakages between the live side and the earth loop in the appliance, the device may include a known form of earth leakage detection. For example, a differential transformer may have its two primary windings in the live and neutral lines of the device, adjacent to the terminal L' and N', and its secondary winding in the earth loop, or in the lower part of the potential divider P, or in the connection to the trigger electrode of the tube P. A plain transformer may be used, with its primary winding in the earth line of the device adjacent to the terminal $E_2'$ and its secondary winding at one of the points mentioned above for the secondary winding of the differential transformer. A further possible way of detecting earth leakages is to include in the earth line, adjacent to the terminal $E_2'$, a non-linear resistor which will produce a potential drop, when current flows in this line, sufficient to raise the potential of the lower end of the divider P enough to fire the tube T, yet under short-circuit conditions the potential of the earth loop in the appliance cannot rise above, say, forty volts.

The trigger tube T may be replaced without difficulty with a transistor, as shown at T' in FIGURE 3, the emitter collector path being in the bridge and the base forming the trigger.

Other forms of trigger device may be used, the only essential requirement being that there should be a conducting path which can be converted from a higher impedance state to a lower impedance state when the potential of a sensitive member or trigger electrode exceeds a pre-arranged value.

It will be appreciated that the devices described place no restrictions on the form of the appliance which may be connected to it; i.e. the appliance may have its own switches and variable elements which can be operated without upsetting the device. Two or more appliances may be connected to the device, although preferably in this case their earth loops are arranged in series for maximum protection.

I claim:

1. A safety device for disposal between a source of current supply and a current-consuming appliance, comprising first and second input supply terminals, an input earth terminal, a bridge circuit having first and second diagonals, connections between said first diagonal and said first and second input terminals, a relay disposed in said second diagonal, first and second output supply terminals, first and second output earth terminals, a current path between said first input and first output supply terminals, a current path between said second input and second output supply terminals, current path between said input earth terminal and first output earth terminal, a trigger device disposed in an arm of said bridge circuit and reversibly changeable between a low impedance condition and a high impedance condition under the control of a trigger electrode, a potential divider, a connection between a first end of said potential divider and said first input supply terminal, a current path from the second end of said potential divider to said second output earth terminal, a connection between an intermediate point in said potential divider and said trigger electrode, and four contacts controlled by said relay, said contacts being disposed respectively in said four current paths to interrupt said paths on de-energisation of said relay, the relationship between the impedance of the arms of said bridge circuit being such that said relay is energised to close said contacts when said trigger device is in its high impedance condition, but when said trigger device is in its low impedance condition said bridge is substantially balanced and said relay is de-energised.

2. A safety device as in claim 1, wherein said trigger device is a cold cathode trigger tube.

3. A safety device as in claim 1 wherein said trigger device is a transistor.

4. A safety device as in claim 1, including a rectifier disposed in one of the connections between said first diagonal and said first and second input terminals.

5. A safety device as in claim 1, including a contact connecting said input earth terminal to the second end of said potential divider in the de-energised state of said relay.

References Cited in the file of this patent

UNITED STATES PATENTS

| | | |
|---|---|---|
| 2,207,202 | Deau | July 9, 1940 |
| 2,554,598 | Storch | May 29, 1951 |
| 2,922,925 | Gerrard | Jan. 26, 1960 |